(12) United States Patent
Vaidya

(10) Patent No.: US 6,383,653 B1
(45) Date of Patent: May 7, 2002

(54) PRESSURE SENSITIVE COHESIVE

(75) Inventor: Milind M. Vaidya, Grand Island, NY (US)

(73) Assignee: Moore North America, Inc., Stamford, CT (US)

( * ) Notice: Subject to any disclaimer, the term of this patent is extended or adjusted under 35 U.S.C. 154(b) by 0 days.

(21) Appl. No.: 09/507,932

(22) Filed: Feb. 22, 2000

(51) Int. Cl.⁷ .............................................. B32B 23/08
(52) U.S. Cl. ....................................................... 428/511
(58) Field of Search ........................... 524/493; 428/511

(56) References Cited

U.S. PATENT DOCUMENTS

| | | | |
|---|---|---|---|
| 4,107,109 A | * 8/1978 | Kassal | ............................. 260/4 |
| 4,755,550 A | 7/1988 | Shuman | |
| 4,918,128 A | 4/1990 | Sakai | |
| 5,143,972 A | 9/1992 | Groves | |
| 5,190,818 A | 3/1993 | Sakai | |
| 5,229,206 A | 7/1993 | Groves | |
| 5,314,944 A | 5/1994 | Chao | |
| 5,424,122 A | 6/1995 | Crandall et al. | |
| 5,427,128 A | 6/1995 | Minkin | |
| 5,427,851 A | * 6/1995 | Mehta | ......................... 428/356 |

FOREIGN PATENT DOCUMENTS

| | | | |
|---|---|---|---|
| EP | 0 349 216 A | | 1/1990 |
| EP | 0 349 219 | * | 1/1990 |
| JP | 62-187777 | | 8/1987 |
| JP | 1-168779 | | 7/1989 |
| JP | 3-220279 | | 9/1991 |

OTHER PUBLICATIONS

"Poly–Polymerization of Methyl Methacrylate and Styrene with the Use of Natural Latex", Ishikawa et al, *Journal of Polymers*, vol. 31, No. 12, 1974, pp. 733–737.

* cited by examiner

*Primary Examiner*—Paul R. Michl
(74) *Attorney, Agent, or Firm*—Nixon & Vanderhye P.C.

(57) ABSTRACT

A pressure sensitive adhesive/cohesive exhibits excellent cohesive body properties, and other desirable features, even when exposed to heat and polysiloxane based lubricants, such as in a laser printer. The formulation comprises 100 parts by weight natural rubber (e.g. electrosterically stabilized natural rubber graft and block terpolymer), and expressed as percentages by weight of the rubber the following components: about 5–35% (e.g. about 28%) acrylate monomer or monomers (such as methyl methacrylate, cyclohexyl methacrylate, benzyl methacrylate, and/or isobornyl methacrylate); about 0.5–8% acrylic acid and/or about 1–10% 4-acetoxystyrene; about 0–20% ethyl hexyl acrylate; about 1–50% (e.g. about 10–30%) finely divided hard particulate material (such as silica gel); 0–50% (preferably about 10–30%) starch; and 0–40% (preferably at least about 5%) carboxylated styrene-butadiene latex, or carboxylated polychloroprene latex, or a styrene-acrylate-acrylonitrile latex, or vinyl-pyridine styrene-butadiene latex, or pre-crosslinked natural rubber latex, or a tackifier, or combinations thereof. The cohesive is coated onto paper and seals to like cohesive upon the application of a force of at least 100 lbs per lineal inch.

24 Claims, No Drawings

PRESSURE SENSITIVE COHESIVE

BACKGROUND AND SUMMARY OF THE INVENTION

U.S. Pat. Nos. 4,918,128 and 5,190,818, provide pressure sensitive adhesives/cohesives that are revolutionary in their utility when utilized with mailers or like type documents or business forms. These patented adhesives have allowed the practical implementation in the mailer industry of mailers which. may be quickly and effectively produced and sealed without the drawbacks associated with conventional heat or moisture activated adhesives.

While the adhesives in the above identified patents are extremely effectively, it is desirable to be able to produce an adhesive that has even better properties. While the adhesives in the above identified patents are not tacky after the application to paper, and do not adhere/seal unless a high level of pressure is applied (which prevents the adhesive from blocking during the printing, which would slow down the processing due to paper jams or the like), sometimes the adhesive action may be hampered by contamination of the printing surface and adhesive with silicone lubricants used in conventional printers (particularly laser printers). The adhesive according to the present invention, when coated on paper or like substrates used in mailer type business forms, or the like, has the same advantageous properties as the adhesives in the above identified patents and also has enhanced functionality when contaminated by silicone lubricants.

Like the preferred embodiments in the above identified patents, the cohesive according to the present invention contains a natural rubber graft, an appropriate acrylate monomer or monomers such as methyl methacrylate (or cyclohexyl methacrylate, or benzyl methacrylate, or isobornyl methacrylate), finely divided hard particles such as silica, and preferably also starch. The cohesive according to the present invention also includes acrylic acid and/or 4-acetoxystyrene, and optionally ethyl hexyl acrylate.

According to the present invention a pressure sensitive adhesive/cohesive is provided comprising the following components: 100 parts by weight natural rubber. About 5–35%, by weight of the rubber, acrylate monomer. About 0.5–8%, by weight of the rubber, acrylic acid and/or about 1–10% by weight of rubber 4-acetoxystyrene. About 0–20%, by weight of the rubber, ethyl hexyl acrylate. 1–50%, by weight of the rubber, a finely divided hard particulate material having substantially no thermoplasticity. 0–50%, by weight of the rubber, starch. And 0–40%, by weight of the rubber, carboxylated styrene-butadiene latex, or carboxylated polychloroprene latex, or vinyl-pyridine styrene-butadiene latex or pre-crosslinked natural rubber latex, or a tackifier, or combinations thereof.

In the case of 4-acetoxystyrene as a comonomer in the graft/block of the rubber, grafted rubber has built-in anti-oxidant as a result of hydrolysis of acetoxy group which provides the cohesive antioxidant property helping its shelf life as a coated cohesive by acting as a free radical scavenger.

The pressure sensitive adhesive/cohesive according to the present invention is typically coated on. a piece of paper. More typically, since the material according to the invention is best as a cohesive, it is coated on two portions of a piece of paper, the cohesive portions in contact with each other as a result of folding the paper (such as by forming a mailer), or bringing a like sheet in contact therewith, and pressure sealed together (such as by running through conventional pressure sealing equipment, such as "Speedisealer®" equipment available from Moore USA of Lake Forest, Ill.), so as to cause paper fiber tear if attempted to be pulled apart.

Preferably, the adhesive/cohesive comprises at least 1% ethyl hexyl acrylate, and at least 1% starch; e.g. about 10–30% starch (such as about 20% starch) having an average particle size of about 5–25 microns. The hard particulate material preferably comprises silica gel, e.g. about 10–30% (such as about 20%), the silica gel having an average particle size of about 0.2–20 microns (e.g. about 0.3–0.4 microns), or a fumed silica (e.g. 0.1–0.3 microns). There also may be at least 5% carboxylated styrene-butadiene latex, or carboxylated polychloroprene latex, or vinyl-pyridine styrene-butadiene latex, or pre-crosslinked natural rubber latex, or a styrene-acrylateacrylonitrile latex, or a tackifier, or combinations thereof. The acrylic monomer preferably comprises methyl methacrylate, e.g. about 5–30%, or 0.5–8% of 4-acetoxystyrene, cyclohexyl methacrylate, benzyl methacrylate, or isobornyl methacrylate; and the acrylic acid typically is between about 0.5–4%, and the 4-acetoxystyrene between about 1–3%. The modified natural rubber latex is preferably electrosterically stabilized natural rubber graft and block terpolymer.

According to another aspect of the present invention a method of making a mailer type business form is provided. The method comprises: (a) applying cohesive as cooperating patterns cohesive to a sheet of paper so that when the sheet is folded, or brought into contact with a like sheet, the patterns move into contact with each other, the cohesive comprising a pressure sensitive cohesive including: 100 parts by weight natural rubber; about 5–35% by weight of the rubber acrylate monomer; about 0–8% (preferably about 0.5–8%) by weight of the rubber acrylic acid and/or about 0–10% (preferably about 1–10%) by weight 4-acetoxystyrene; about 0–20% by weight of the rubber ethyl hexyl acrylate; 1–50% by weight of the rubber a finely divided hard particulate material having substantially no thermoplasticity; 0–50% by weight of the rubber starch; and 0–40% by weight of the rubber carboxylated styrene-butadiene latex, styrene-acrylate-acrylonitrile latex, or carboxylated polychloroprene latex, or vinyl-pyridine styrene-butadiene latex, or pre-crosslinked natural rubber latex, or a tackifier, or combinations thereof.

The method may comprise the further steps of: (b) folding the paper to move the cohesive patterns into contact with each other, and (c) applying a sealing pressure of at least about 100 lbs/lineal inch (e.g. about 200 lbs/lineal inch) to the patterns to seal the cohesive together so as to cause fiber tear if attempted to be pulled apart.

It is a primary object of the present invention to provide a pressure sensitive cohesive/adhesive which exhibits excellent adhesive bonding, cohesive bonding, resistance to heat, blocking resistance, resistance to abrasion, non-tackiness, good creep properties, and substantially no loss in adhesion/cohesion upon exposure to heat and polysiloxane based lubricants. This and other objects of the invention will become clear from an inspection of the detailed description of the invention and from the appended claims.

DETAILED DESCRIPTION OF THE INVENTION

The general invention as described above will now be set forth with respect to some specific examples.

EXAMPLE 1

Electrosterically stabilized latex of natural rubber graft and block terpolymer with about 1.5% by weight of acrylic acid and about 28.5% by weight of methyl methacrylate and 0% by weight of ethyl hexyl acrylate, was admixed with fumed/or precipitated silicon dioxide (silica gel) with an average aggregate particle size of from about 0.2 μm to 0.6 μm in an amount about 20% by weight and a starch, with a specified range of about 10 μm average particle diameter in an amount of about 14.5 weight % per 100 parts by weight of modified electrosterically stabilized natural rubber, to prepare a pressure sensitive adhesive/cohesive. The terpolymer latex in this example is referred to as latex 1, and the formulation preparation in this example will be referred to as cohesive 1.

EXAMPLE 2

Electrosterically stabilized latex of natural rubber graft and block terpolymer with 3% by weight of acrylic acid and about 28% by weight of methyl methacrylate and 0% by weight of ethyl hexyl acrylate was admixed with fumed/or precipitated silicon dioxide (silica gel) with an average particle diameter of about 0.4 μm in an amount of about 20% by weight and a starch, with a specified range of about 10 μm average particle diameter in an amount of about 14.5 weight % per 100 parts by weight of modified electrosterically stabilized natural rubber to prepare a pressure sensitive adhesive/cohesive. The terpolymer latex in this Example 2 is referred to as latex 2, and the formulation preparation in this example will be referred to as cohesive 2.

EXAMPLE 3

The cohesives of Examples 1 and 2, namely cohesive I and II, were coated on 20 pound paper using a No. 4 Meyer rod.

EXAMPLE 4

Electrosterically stabilized latex of natural rubber graft and block terpolymer with about 1.5% by weight of acrylic acid and about 23% by weight of methyl methacrylate and 0% by weight of ethyl hexyl acrylate was admixed with fumed/or precipitated silicon dioxide (silica gel) with an average particle diameter of about 0.3~0.4 μm in an amount of about 20% by weight per 100 parts by weight of modified electrosterically stabilized natural rubber to prepare a pressure sensitive adhesive/cohesive. The terpolymer latex in this example is referred to as latex 4, and the formulation preparation in this example will be referred to as cohesive 4.

EXAMPLE 5

Electrosterically stabilized latex of natural rubber graft and block terpolymer with about 1.5% by weight of acrylic acid and about 20% by weight of methyl methacrylate and 0% by weight of ethyl hexyl acrylate was admixed with fumed/or precipitated silicon dioxide (silica gel) with an average particle diameter of about 0.3~0.4 μm in an amount of about 20% by weight per 100 parts by weight of modified electrosterically stabilized natural rubber to prepare a pressure sensitive adhesive/cohesive. The terpolymer latex in this example is referred to as a latex 5, and the formulation preparation in this example will be referred to as cohesive 5.

EXAMPLE 6

Electrosterically stabilized latex of rubber graft and block terpolymer with about 1.5% by weight of acrylic acid and about 16% by weight of methyl methacrylate and 0% by weight of ethyl hexyl acrylate was admixed with fumed/or precipitated silicon dioxide (silica gel) with an average particle diameter of about 0.3~0.4 μm in an amount of about 20% by weight per 100 parts by weight of modified electrosterically stabilized natural rubber to prepare a pressure sensitive adhesive/cohesive. The terpolymer latex in this example is referred to as latex 6, and the formulation preparation in this example will be referred to as cohesive 6.

EXAMPLE 7

Electrosterically stabilized latex of natural rubber graft and block terpolymer with about 2.5% by weight of acrylic acid and about 15% by weight of methyl methacrylate and 0% by weight of ethyl hexyl acrylate was admixed with fumed/or precipitated silicon dioxide (silica gel) with an average particle diameter of about 0.3~0.4 μm in an amount of about 20% by weight per 100 parts by weight of modified electrosterically stabilized natural rubber, to prepare a pressure sensitive adhesive/cohesive. The terpolymer latex in this example is referred to as latex 7, and the formulation preparation in this example will be referred to cohesive 7.

EXAMPLE 8

Electrosterically stabilized latex of natural rubber graft and block terpolymer with about 3% by weight of 4-acetoxystyrene and about 15% by weight of methyl methacrylate and 0% by weight of acrylic acid was admixed with fumed/or precipitated silicon dioxide (silica gel) with an average particle diameter of about 0.3~0.4 μm in an amount of about 20% by weight per 100 parts by weight of modified electrosterically stabilized natural rubber, to prepare a pressure sensitive adhesive/cohesive. 4-acetoxystyrene rubber has a built-in antioxidant in the polymer chain helping the polymer against oxidation. The terpolymer latex in this example is referred to as latex 8, and the formulation preparation in this example will be referred to as cohesive 8.

EXAMPLE 9

Electrosterically stabilized latex of natural rubber graft and block terpolymer with about 1.5% by weight of 4-acetoxystyrene and about 15% by weight of methyl methacrylate and 0% by weight of acrylic acid was admixed with fumed/or precipitated silicon dioxide (silica gel) with an average particle diameter of about 0.3~0.4 μm in an amount of about 20% by weight per 100 parts by weight of modified electrosterically stabilized natural rubber, to prepare a pressure sensitive adhesive/cohesive. 4-acetoxystyrene rubber has a built-in antioxidant in the polymer chain helping the polymer against oxidation. The terpolymer latex in this example is referred to as latex 9, and the formulation preparation in this example will be referred to as cohesive 9.

EXAMPLE 10

Commercially available cohesive (TN-124) referred to as cohesive 10.

EXAMPLE 11

Commercially available cohesive (TN-124F) referred to as cohesive 11.

EXAMPLE 12

Electrostatically stabilized latex of natural rubber graft and block terpolymer with 4% by weight of cyclohexyl methacrylate and about 12% by weight of methyl methacrylate and 0% by weight of acrylic acid was admixed with fumed/or precipitated silicon dioxide/or silica gel with an average particle diameter of about 0.3~0.4 μm in amount of about 20% by weight per 100 parts by weight of modified electrostatically stabilized natural rubber, to prepare a pressure sensitive adhesive/cohesive. The. terpolymer latex in this example is referred to as latex 9, and the formulation preparation in this example is referred to as cohesive 12.

Along with the above mentioned samples, for comparison 12 samples each with TN-124 and TN-124F (commercially available) were prepared by coating with an applicator no. 4 Meyer rod and dried in an oven to form a thin film of about 7~9 μm thickness for 24 pound paper. Two minutes after the samples were sealed, the samples were peeled to examine the sealing quality and also it was observed that dried samples were not at all tacky.

|  | THICKNESS μm | SEALING WITHOUT SILICONE LUBRICANT | SEALING AFTER IMAGING THROUGH XEROX 4050 2 MIN DELAY | SEALING AFTER IMAGING THROUGH XEROX 4635 2 MIN DELAY | BLOCKING IN THE LASER PRINTER | RUBBING TEST |
|---|---|---|---|---|---|---|
| Cohesive 1 | 7~9 μm | Very strong, fiber tear | Very strong, fiber tear | poor | No | pass |
| Cohesive 2 | 7~9 μm | Very strong, fiber tear | Very strong, fiber tear | poor | No | pass |
| Cohesive 3 | 7~9 μm | Very strong, fiber tear | Very strong, fiber tear | poor | No | pass |
| Cohesive 4 | 7~9 μm | Very strong, fiber tear | Very strong, fiber tear | fair | No | pass |
| Cohesive 5 | 7~9 μm | Very strong, tiber tear | Very strong, fiber tear | fair | No | pass |
| Cohesive 6 | 7~9 μm | Very strong, fiber tear | Very strong, fiber tear | Very strong, fiber tear | No | pass |
| Cohesive 7 | 7~9 μm | Very strong, fiber tear | Very strong, fiber tear | Very strong, fiber tear | No | pass |
| Cohesive 8 | 7~9 μm | Very strong, fiber tear | Very strong, fiber tear | Very strong, fiber tear | No | pass |
| Cohesive 9 | 7~9 μm | Very strong, fiber tear | Very strong, fiber tear | Very strong, fiber tear | No | pass |
| Cohesive 10 | 7~9 μm | Very strong, fiber tear | Good, fiber tear | poor | No | pass |
| Cohesive 11 | 7~9 μm | Very strong, fiber tear | Very strong, fiber tear | Very strong, fiber tear | No | pass |
| Cohesive 12 | 7~9 μm | Very strong, fiber tear | Very strong, fiber tear | Very strong, fiber tear | No | pass |

FORMULATION OF COHESIVES I, II, III, IV, V, VI, VII, VIII, IX, XII

| INGREDIENTS | SUPPLIER | PHR |
|---|---|---|
| Latex 1 or 2 or 4 or 5 or 6 or 7 or 8 or 9 or 12 | Moore | 100 |
| Silica Cabotex A-2095 | Cabot | 20.1 |
| Wheat Starch | ADM | 14.5 |
| Surfactant Surfynol GA | Air Products % Chemicals Co. | 1.72 |
| Thickener Cellusize | Union Carbide | 1.08 |
| Antiseptic Nalco 7635 | Nalco | 0.49 |
| Defoamer SN-381 | Sun Nopco | 0.74 |
| Total |  | 138.56 |

Application and Testing:

The resulting formulations Cohesives I, II, IV, V, VI, VII, VIII, IX and XII were applied to 24 pound paper to form a film by an applicator no. 4 Meyer rod and dried in an oven to form a thin film about 7~9 μm thick for a 24 pound paper (12 samples each).

Two of the samples were sealed with PS-4 Speedisealer® equipment available from Moore North America, Inc., Lake Forest, Ill., with 200 PLI pressure without exposure to the imaging environment. Two minutes after the samples were sealed, the samples were peeled. All samples sealed properly and showed a fiber tear and also it was observed that dried samples were not at all tacky.

Out of remaining 10 samples, 5 samples were run through a Xerox 4050 Laser printer and 5 samples were run through a Xerox 4635 printer in order to expose the cohesive film to heat and silicone lubricants. After waiting for 2 minute all 10 samples were sealed with a PS-4 Speedisealer® equipment with 200 PLI pressure. Two minutes after the samples were sealed, the samples were peeled to examine the sealing quality and also it was observed that dried samples were not at all tacky. Also after running through the Xerox 4050 and Xerox 4635 printers, the samples showed no sign of blocking, or jamming in the Xerox printers.

If used, the carboxylated styrene-butadiene latex may be from Ameripol-Synpol, and/or the carboxylated polychloroprene latex from Butachlor XL 415 from Enichem Elastomers America, and/or the vinyl-pyridine styrene-butadiene latex from Pliocord Vp-5622 from Goodyear and/or styrene-acrylate-acrylate latex from OMNOVA Inc. The details of the acrylic acid, ethyl hexyl acrylate, cyclohexyl methacrylate, benzyl methacrylate, isobornyl methacrylate, 4-acetoxystyrene, the range of percentage for the various components, and the average particle diameter for the starch and finely divided hard particulate material having substantially no thermal plasticity (preferably silica gel), are as described above in the Background and Summary of the Invention. Other modifications are also possible, including coatings on other types of paper besides 20 lb. and 24 lb., and 28 lb. and mailers of all different types may be made, including V-fold, Z-fold, and C-fold, as are conventional, or sheets of paper mated face-to-face. Other types of sealing equipment, as well as conventional folding equipment, can be utilized, in the practice of the method of the invention, and in the production of business forms pursuant to the invention. Also, other types of products can be produced aside from mailer type business forms. The documents/sheets of paper may be preprinted before being fed to a laser (or like) printer or the like, the laser printer imprinting variable and/or non-variable indicia thereon, by applying toner.

The invention also specifically includes all narrower ranges within a broad range. For example 1–10% means 2–9%, 1.9–3%, 6–9.5%, and all other narrower ranges within the broad range.

It will thus be seen that according to the present invention a highly advantageous pressure sensitive adhesive/cohesive, mailer-type business forms and/or pieces of paper coated thereby, have been provided as well as a method of making mailer type business forms. While the invention has been herein shown and described in what is presently conceived to be the most practical and preferred embodiment thereof, many modifications may be made within the scope of the invention, which scope is to be accorded the broadest interpretation of the appended claims so as to encompass all equivalent products, formulations, and methods.

What is claimed is:

1. A mailer type business form on which pressure sensitive adhesive/cohesive is applied, said pressure sensitive adhesive/cohesive comprising:
    100 parts by weight natural rubber;
    about 5–35% by weight of the rubber at least one acrylate monomer;
    about 0.5–8% by weight of the rubber acrylic acid and/or about 1–10% by weight of rubber 4-acetoxystyrene;
    about 0–20% by weight of the rubber ethyl hexyl acrylate;
    1–50% by weight of the rubber a finely divided hard particulate material having substantially no thermoplasticity;
    0–50% by weight of the rubber starch; and
    5–40% by weight of the rubber carboxylated styrene-butadiene latex, or carboxylated polychloroprene latex, or vinyl-pyridine styrene-butadiene latex, or styrene-acrylate-acrylonitrile latex, or pre-crosslinked natural rubber latex, or a tackifier, or combinations thereof.

2. A mailer type business form on which pressure sensitive adhesive/cohesive is applied, said pressure sensitive adhesive/cohesive comprising:
    100 parts by weight natural rubber;
    about 5–35% by weight of the rubber at least one acrylate monomer;
    about 0–8% by weight of the rubber acrylic acid and/or about 1–10% by weight of rubber 4-acetoxystyrene;
    about 0–20% by weight of the rubber ethyl hexyl acrylate;
    1–50% by weight of the rubber a finely divided hard particulate material having substantially no thermoplasticity;
    0–50% by weight of the rubber starch; and
    0–40% by weight of the rubber carboxylated styrene-butadiene latex, or carboxylated polychloroprene latex, or vinyl-pyridine styrene-butadiene latex, or styrene-acrylate-acrylonitrile latex, or pre-crosslinked natural rubber latex, or a tackifier, or combinations thereof.

3. A mailer type business form as recited in claim 2 wherein the natural rubber is electrosterically stabilized latex of natural rubber graft and block terpolymer, and wherein the adhesive/cohesive is coated on a piece of paper.

4. A mailer type business form as recited in claim 3 said pressure sensitive adhesive/cohesive coated on two portions of a piece of paper, said cohesive portions in contact with each other as a result of folding the paper, and pressure sealed together, so as to cause paper fiber tear if attempted to be pulled apart.

5. A mailer type business form as recited in claim 3 said pressure sensitive adhesive/cohesive having a built-in antioxidant in the electrosterically stabilized latex of natural rubber graft and block terpolymer when 4-acetoxystyrene is used as a comonomer in grafting which gives an oxidative stability to the pressure sensitive adhesive/cohesive.

6. A mailer type business form as recited in claim 2 said pressure sensitive adhesive/cohesive comprising at least 1% ethyl hexyl acrylate.

7. A mailer type business form as recited in claim 2 said pressure sensitive adhesive/cohesive comprising at least 1% starch, and wherein the natural rubber comprises an electrosterically stabilized natural graft and block terpolymer.

8. A mailer type business form as recited in claim 2 said pressure sensitive adhesive/cohesive comprising about 10–30% starch having an average particle size of about 5–25 microns.

9. A mailer type business form as recited in claim 8 wherein the hard particulate material comprises about 10–30% silica gel having an average particle size of about 0.1–20 microns.

10. A mailer type business form as recited in claim 2 said pressure sensitive adhesive/cohesive comprising at least 5% carboxylated styrene-butadiene latex, or carboxylated polychloroprene latex, or vinyl-pyridine styrene-butadiene latex, or pre-crosslinked natural rubber latex, or a styrene-acrylate-acrylonitrile latex, or a tackifier, or combinations thereof.

11. A mailer type business form as recited in claim 2 said pressure sensitive adhesive/cohesive comprising about 1.5–4% acrylic acid, and wherein the acrylic monomer comprises about 15–35% methyl methacrylate.

12. A mailer type business form as recited in claim 9 wherein the acrylic monomer comprises methyl methacrylate.

13. A mailer type business form as recited in claim 4 said pressure sensitive adhesive/cohesive comprising at least 1% starch, and wherein the natural rubber comprises an electrosterically stabilized natural graft and block terpolymer.

14. A mailer type business form as recited in claim 4 said pressure sensitive adhesive/cohesive comprising about 10–30% starch having an average particle size of about 5–25 microns.

15. A mailer type business form as recited in claim 4 wherein the hard particulate material comprises about 10–30% silica gel having an average particle size of about 0.3–0.4 microns.

16. A mailer type business form as recited in claim 4 said pressure sensitive adhesive/cohesive comprising at least 5% carboxylated styrene-butadiene latex, or carboxylated polychloroprene latex, or vinyl-pyridine styrene-butadiene latex, or pre-crosslinked natural rubber latex, or a styrene-acrylate-acrylonitrile latex, or a tackifier, or combinations thereof.

17. A mailer type business form as recited in claim 4 said pressure sensitive adhesive/cohesive comprising about 1.5–4% acrylic acid, and wherein the acrylic monomer comprises about 5–30% methyl methacrylate.

18. A mailer type business form as recited in claim 3 said pressure sensitive adhesive/cohesive comprising at least 1% starch.

19. A mailer type business form as recited in claim 18 said pressure sensitive adhesive/cohesive comprising at least 1% ethyl hexyl acrylate, and wherein the natural rubber comprises an electrosterically stabilized natural graft and block terpolymer.

20. A mailer type business form as recited in claim 17 said pressure sensitive adhesive/cohesive comprising at least 5% carboxylated styrene-butadiene latex, or carboxylated polychloroprene latex, or vinyl-pyridine styrene-butadiene latex, or pre-crosslinked natural rubber latex, or a styrene-acrylate-acrylonitrile latex, or a tackifier, or combinations thereof.

21. A method of making a mailer type business form as recited in claim 1, comprising:
    (a) applying cohesive as cooperating patterns to a sheet of paper so that when the sheet is folded or moved into contact with a like coated sheet, the patterns move into contact with each other, the cohesive comprising a pressure sensitive cohesive including:
        100 parts by weight natural rubber; about 5–35% by weight of the rubber at least one acrylate monomer; about 0.5–8% by weight of the rubber acrylic acid and/or about 1–10% by weight of the rubber 4-acetoxystyrene; about 0–20% by weight of the rubber ethyl hexyl acrylate; 1–50% by weight of the rubber a finely divided hard particulate material having substantially no thermoplasticity; 0–50% by weight of the rubber starch and 5–40% by weight of the rubber carboxylated styrene-butadiene latex, or carboxylated polychloroprene latex, or vinyl-pyridine styrene-butadiene latex, or styrene-acrylate-acrylonitrile latex, or pre-crosslinked natural rubber latex, or a tackifier, or combinations thereof.

22. A method as recited in claim 21 further comprising: (b) folding the paper to move the cohesive patterns into contact with each other, and (c) applying a sealing pressure of at least about 100 lbs/lineal inch to the patterns to seal the cohesive together so as to cause fiber tear if attempted to be pulled apart.

23. A method of making a mailer type business form as recited in claim 2, comprising:

(a) applying cohesive as cooperating patterns to a sheet of paper so that when the sheet is folded or moved into contact with a like coated sheet, the patterns move into contact with each other, the cohesive comprising a pressure sensitive cohesive including:

100 parts by weight natural rubber; about 5–35% by weight of the rubber at least one acrylate monomer; about 0–8% by weight of the rubber acrylic acid and/or about 1–10% by weight of the rubber 4-acetoxystyrene; about 0–20% by weight of the rubber ethyl hexyl acrylate; 1–50% by weight of the rubber a finely divided hard particulate material having substantially no thermoplasticity; 0–50% by weight of the rubber starch; and 0–40% by weight of the rubber carboxylated styrene-butadiene latex, or carboxylated polychloroprene latex, or vinyl-pyridine styrene-butadiene latex, or styrene-acrylate-acrylonitrile latex, or pre-crosslinked natural rubber latex, or a tackifier, or combinations thereof.

24. A method as recited in claim 23 further comprising: (b) folding the paper to move the cohesive patterns into contact with each other, and (c) applying a sealing pressure of at least about 100 lbs/lineal inch to the patterns to seal the cohesive together so as to cause fiber tear if attempted to be pulled apart.

* * * * *